US008682660B1

(12) United States Patent
Lyudovyk et al.

(10) Patent No.: US 8,682,660 B1
(45) Date of Patent: Mar. 25, 2014

(54) METHOD AND SYSTEM FOR POST-PROCESSING SPEECH RECOGNITION RESULTS

(75) Inventors: Yevgeniy Lyudovyk, Morganville, NJ (US); Jacek Jarmulak, Grapevine, TX (US)

(73) Assignee: Resolvity, Inc., Irving, TX (US)

( * ) Notice: Subject to any disclaimer, the term of this patent is extended or adjusted under 35 U.S.C. 154(b) by 859 days.

(21) Appl. No.: 12/454,451

(22) Filed: May 16, 2009

Related U.S. Application Data (60) Provisional application No. 61/054,970, filed on May 21, 2008, provisional application No. 61/130,120, filed on May 27, 2008.

(51) Int. Cl.
G06F 17/27 (2006.01)
G10L 15/00 (2013.01)
G10L 15/04 (2013.01)

(52) U.S. Cl.
USPC ............... 704/231; 704/9; 704/239; 704/240; 704/251

(58) Field of Classification Search
USPC ............... 704/231, 239, 240, 9, 251
See application file for complete search history.

(56) References Cited

U.S. PATENT DOCUMENTS

| | | | | |
|---|---|---|---|---|
| 4,937,872 A * | 6/1990 | Hopfield et al. | | 704/232 |
| 5,267,345 A * | 11/1993 | Brown et al. | | 704/255 |
| 5,271,088 A * | 12/1993 | Bahler | | 704/200 |
| 5,418,717 A * | 5/1995 | Su et al. | | 704/9 |
| 5,828,999 A * | 10/1998 | Bellegarda et al. | | 704/240 |
| 5,839,106 A * | 11/1998 | Bellegarda | | 704/257 |
| 5,987,404 A * | 11/1999 | Della Pietra et al. | | 704/9 |
| 6,064,957 A | 5/2000 | Brandow et al. | | |
| 6,157,912 A * | 12/2000 | Kneser et al. | | 704/270 |
| 6,324,510 B1 * | 11/2001 | Waibel et al. | | 704/256.7 |
| 6,374,217 B1 * | 4/2002 | Bellegarda | | 704/240 |
| 6,442,522 B1 * | 8/2002 | Carberry et al. | | 704/257 |
| 6,477,488 B1 * | 11/2002 | Bellegarda | | 704/9 |
| 6,609,087 B1 * | 8/2003 | Miller et al. | | 703/22 |
| 6,823,307 B1 * | 11/2004 | Steinbiss et al. | | 704/252 |
| 6,839,670 B1 * | 1/2005 | Stammler et al. | | 704/251 |
| 6,871,174 B1 * | 3/2005 | Dolan et al. | | 704/9 |
| 6,920,420 B2 * | 7/2005 | Lin | | 704/9 |

(Continued)

OTHER PUBLICATIONS

E.K. Ringer, J.F. Allen, "Error Correction via a Post-Processor for Continuous Speech Recognition", in: Acoustics, Speech, and Signal Processing, ICASSP-96. Conference Proceedings. vol. 1, ISBN: 0-7803-3192-3, pp. 427430, (1996).

(Continued)

Primary Examiner — Eric Yen (57) ABSTRACT

A system and a method to correct semantic interpretation recognition errors presented in this invention applies to Automatic Speech Recognition systems returning recognition results with semantic interpretations. The method finds the most likely intended semantic interpretation given the recognized sequence of words and the recognized semantic interpretation. The key point is the computation of the conditional probability of the recognized sequence of words given the recognized semantic interpretation and a particular intended semantic interpretation. It is done with the use of Conditional Language Models which are Statistical Language Models trained on a corpus of utterances collected under the condition of a particular recognized semantic interpretation and a particular intended semantic interpretation. Based on these conditional probabilities and the joint probabilities of the recognized and intended semantic interpretations, new semantic interpretation confidences are computed. The semantic interpretation with the maximum new confidence is declared the corrected semantic interpretation.

6 Claims, 8 Drawing Sheets

(56) References Cited

U.S. PATENT DOCUMENTS

| | | | |
|---|---|---|---|
| 6,922,489 B2* | 7/2005 | Lennon et al. | 382/228 |
| 7,117,437 B2* | 10/2006 | Chen et al. | 715/254 |
| 7,254,539 B2* | 8/2007 | Carberry et al. | 704/257 |
| 7,475,015 B2* | 1/2009 | Epstein et al. | 704/257 |
| 7,478,038 B2* | 1/2009 | Chelba et al. | 704/10 |
| 7,593,843 B2* | 9/2009 | Aue et al. | 704/2 |
| 7,734,623 B2* | 6/2010 | Witbrock et al. | 707/723 |
| 2001/0044719 A1* | 11/2001 | Casey | 704/245 |
| 2004/0122657 A1* | 6/2004 | Brants et al. | 704/9 |
| 2005/0256700 A1* | 11/2005 | Moldovan et al. | 704/9 |
| 2007/0094022 A1* | 4/2007 | Koo et al. | 704/251 |
| 2011/0004475 A1* | 1/2011 | Bellegarda | 704/251 |

OTHER PUBLICATIONS

E.K. Ringer, J.F. Allen, "Robust Error Correction of Continuous Speech Recognition", in: Proceedings of the ESCA-NATO Robust Workshop, 1997.

M. Jeong, S. Jung, G.G. Lee, "Speech Recognition Error Correction Using Maximum Entropy Language Model", in: INTERSPEECH-2004, ICSLP 8th International Conference on Spoken Language Processing, Jeju Island, Korea, Oct. 4-8, pp. 2137-2140, (2004).

\* cited by examiner

METHOD AND SYSTEM FOR POST-PROCESSING SPEECH RECOGNITION RESULTS

CROSS REFERENCE TO RELATED APPLICATIONS

This application claims priority to U.S. Provisional Patent Application No. 61/054,970 filed May 21, 2008 and U.S. Provisional Patent Application No. 61/130,120 filed May 27, 2008, which are hereby incorporated by reference in their entirety.

FIELD OF THE INVENTION

The present invention applies to post processing of speech recognition results.

STATEMENT REGARDING FEDERALLY SPONSORED RESEARCH OR DEVELOPMENT

Not Applicable.

BACKGROUND OF THE INVENTION

There exist many methods of post-processing of speech recognition results with the goal to improve word error rate, see (Ringer & Allen, Error correction via a Post-Processor for continuous Speech recognition, 1996; Ringer & Allen, Robust Error Correction of Continuous Speech Recognition, 1997; Jeong, et al., Speech Recognition Error Correction Using Maximum Entropy Language Model, 2004; U.S. Pat. No. 6,064,957). These post-processing methods are usually based on the paradigm of a channel with noise that takes as input a user utterance with a sequence of words contained in it, recognizes it and returns the recognized sequence of words as a distorted (noised) version. Usually these methods rely on a corpus of utterances that need to be transcribed in terms of words contained in them. Such transcribing is a time consuming, expensive and error-prone process.

The present invention can also be viewed through the same paradigm of the noisy channel, but with the following differences. The channel takes as input: a user utterance with (a) a sequence of words contained in it, and (b) a concept—a semantic tag representing the meaning of the uttered words. The channel outputs: (a) a recognized sequence of words and (b) a recognized concept—a recognized semantic tag.

Another difference consists in the channel quality criterion: instead of word error rate, we are interested in semantic tag error rate. So the post-processing aims at reducing the semantic tag recognition error rate using the recognized words just as a means, not as a goal.

BRIEF SUMMARY OF THE INVENTION

This invention presents a method and a system for post processing of speech recognition results. Recognition results are produced by an Automatic Speech Recognition (ASR) system using some mechanism to assign a semantic interpretation to a recognized sequence of words. One of the possible ways to do that is to use as single Statistical Language Model (SLM) describing the utterances for all possible semantic interpretations. In this case an ASR system would originally return just a sequence of recognized words from which the recognized semantic interpretation would be worked out. Another possible way would be to use a set of parallel SLMs each labeled with a particular semantic interpretation (semantic tag) so that a particular recognized sequence of words would be automatically assigned a recognized semantic interpretation defined by the particular SLM that accepted this recognized sequence of words.

The presented method finds such a potential intended semantic interpretation (which may be different from the recognized semantic interpretation) that minimizes the error rate of semantic interpretation recognition given the recognition result (recognized sequence of words and recognized semantic interpretation). Although the following explanation is based on the example with several parallel SLMs (called first level SLMs) each labeled with the appropriate semantic interpretation, the invention applies to ASR using any mechanism to assign recognized semantic interpretations.

The method works by maximizing the a-posteriori probability of the intended semantic concept (interpretation) which is computed with the use of Conditional Language Models that are created from a corpus of recognition results collected under the condition of a particular recognized semantic interpretation and a particular intended semantic interpretation. The method capitalizes on the correlation that exists between the intended semantic interpretation and the recognized sequence of words even if the recognized semantic interpretation is wrong, that is different from the intended one.

BRIEF DESCRIPTION OF THE DRAWINGS

The accompanying drawings, wherein like referenced numerals are employed to designate like parts or steps, are included to provide further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Figure 1:
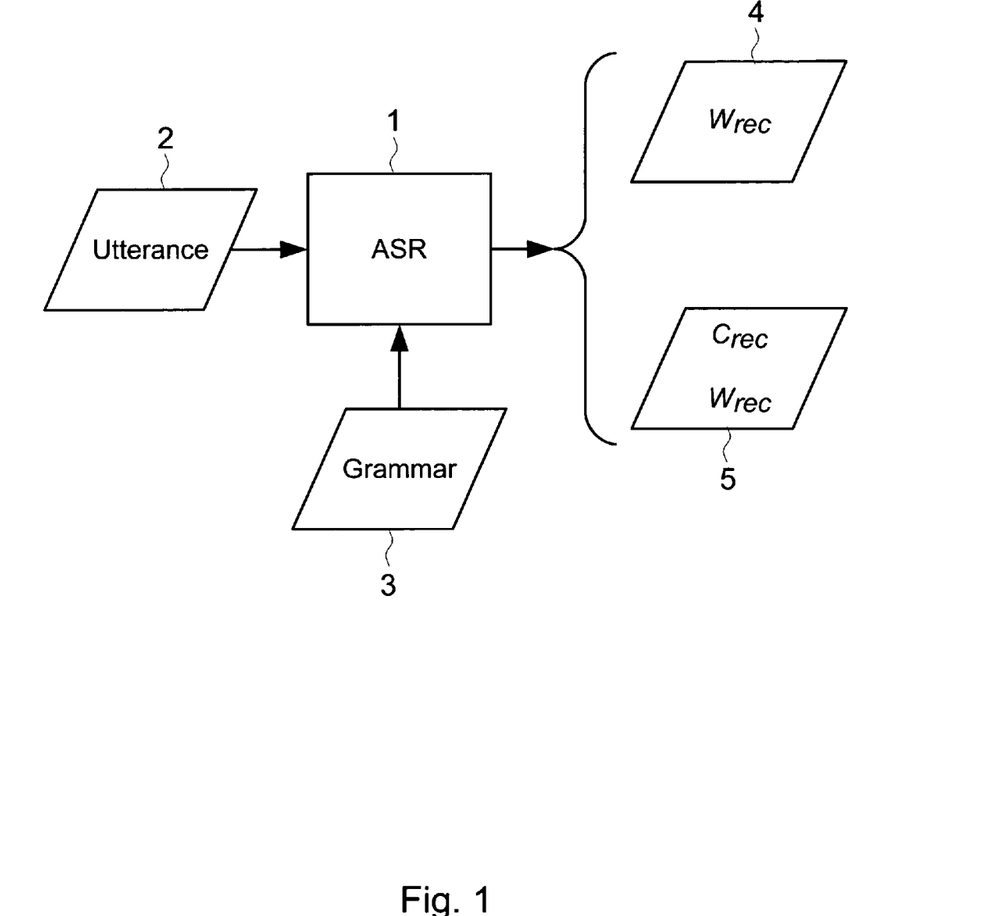
FIG. 1 shows the input to and the possible outputs of an Automatic Speech Recognition Engine (ASR).

FIG. 1 shows a generic Automatic Speech Recognition (ASR) setup where an ASR engine 1 uses grammar 3 to recognize spoken utterance 2. The result of the recognition may be either a sequence of words Wrec 4, or a combination of a Wrec and a semantic interpretation Crec 5. Generally, recognized Wrec 4 or Wrec & Crec 5 will not always correspond to the content of the original utterance 2 due to recognition errors.

Figure 2:
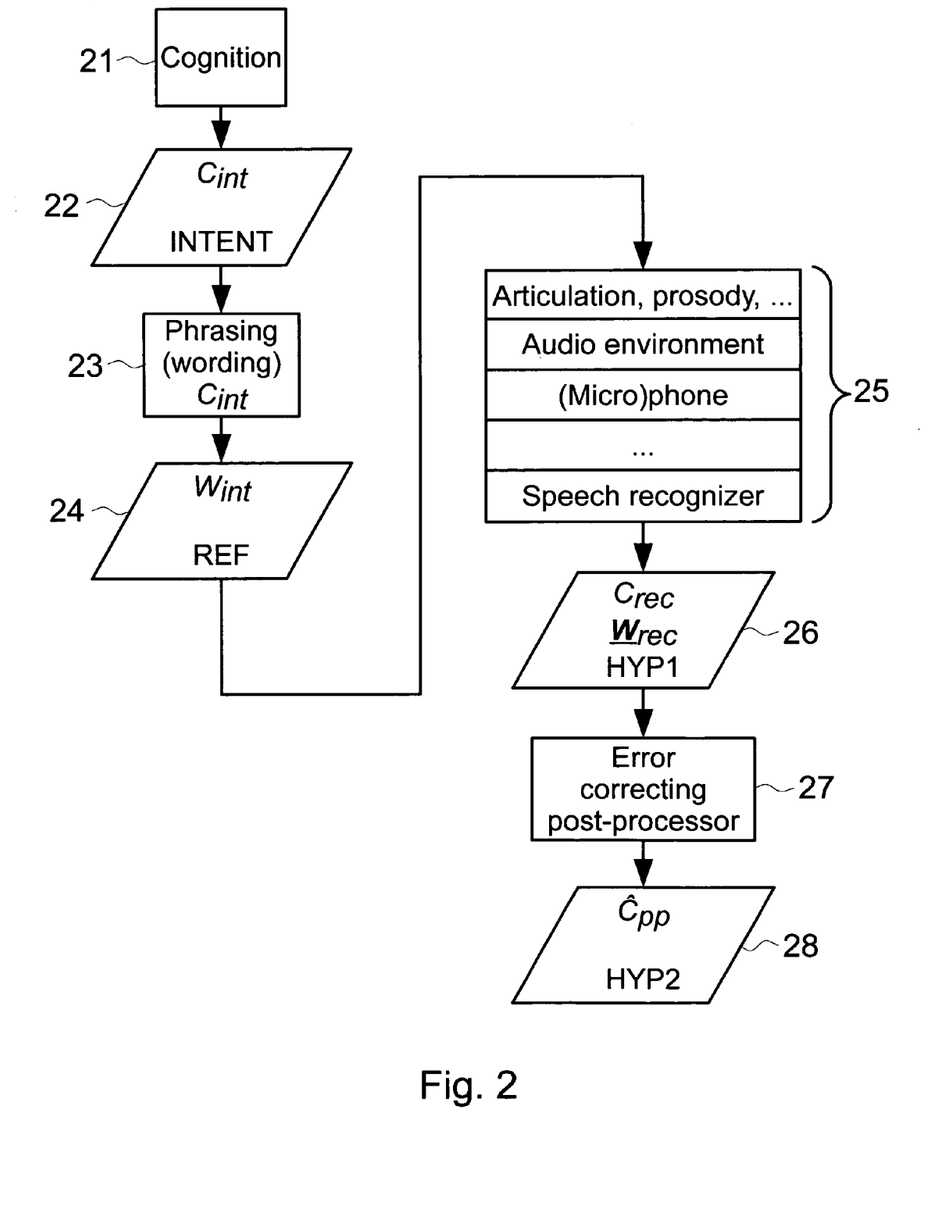
FIG. 2 shows the principles behind the current invention where post-processing improves accuracy of the recognition of a semantic concept by compensating for error introduced in the channel.

FIG. 2 shows the principles behind the idea of correcting the semantic interpretation returned by a speech recognition system. A speaker thinks 21 about some concept Cint 22 and then speaks 23 word or words Wint 24 that identify that concept (subscript "int" stands for "intended"). Words can be articulated in a variety of ways, with various prosody, and so on. These spoken words together with any background noise are then captured by a microphone. A microphone may have its own specific characteristics as far as the sound capture is concerned. The sound then is digitized and the digital representation enters the speech recognizer which performs the recognition. All of these steps 25 introduce distortions (noise). Speech recognizer will compensate for some of this noise, but it cannot compensate for all variations in the entirety of the channel 25. This means that the result of recognition (semantic concept Crec and/or word sequence Wrec) 26 will be incorrect in some percentage of the recognition acts. Now, if some of the recognition errors result from a systematic noise introduced in the channel 25, it is possible to apply post-processing 27 to compensate for these systematic errors, this way leading to, on average, better recognition $\hat{C}pp$ 28.

The method and system described in this patent may improve the accuracy of such semantic interpretation recognition using the recognized sequence of words and Conditional Language Models in the post-processing step 27.

As a similar basic principle has been used in prior-art to improve recognition results, it is important to highlight how the present invention is different from that prior art.

Figure 3:
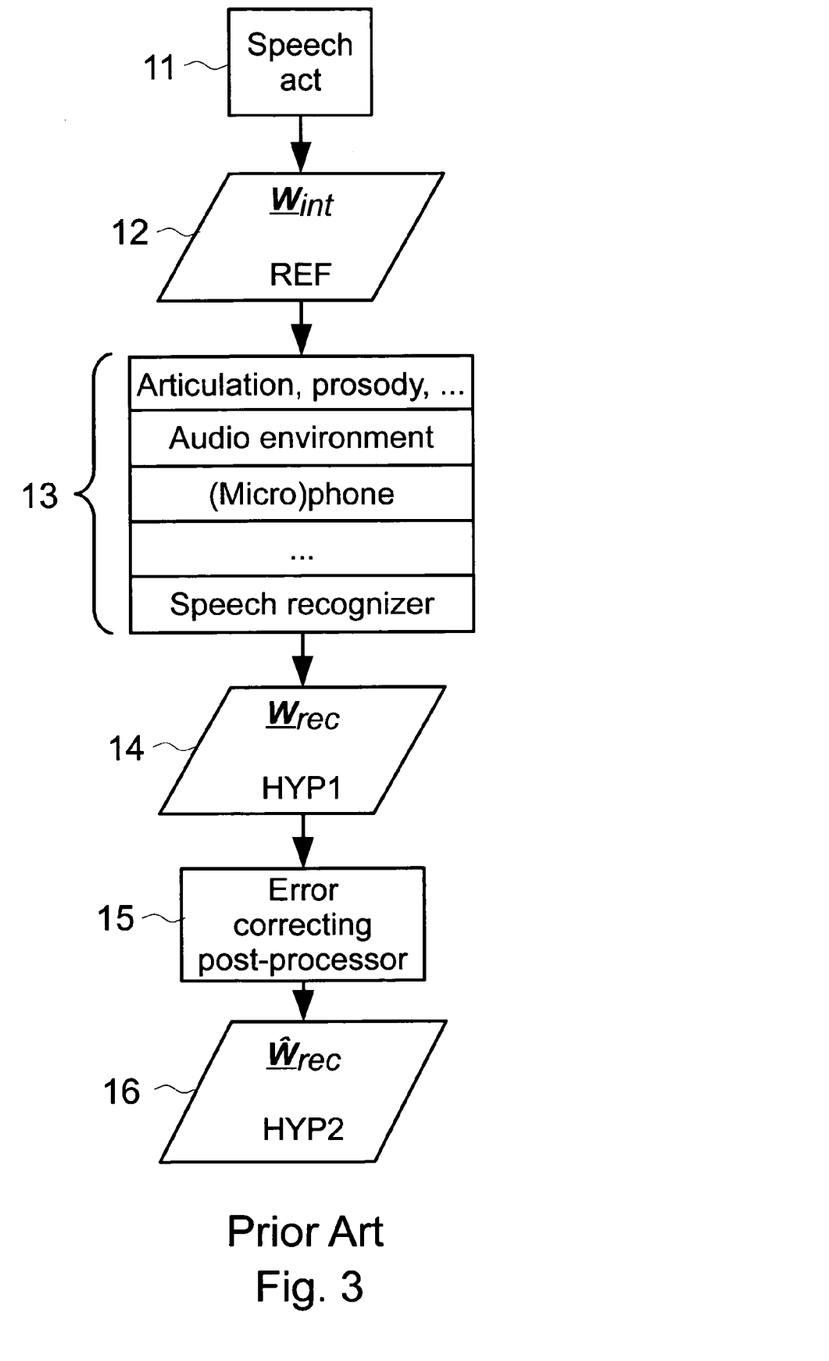
FIG. 3 shows example of prior art that relies on the same basic principle of noisy channel, however applies to a different type of recognition results.

FIG. 3 (based on: Ringer & Allen, Robust Error Correction of Continuous Speech Recognition, 1997) showing prior art is similar to FIG. 2 especially concerning the channel 13 as compared to channel 25. The only difference between channels 25 and 13 is that the speech recognizer in 13 returns only word sequences as recognition results, as opposed to speech recognizer in channel 25 which additionally returns semantic interpretations (compare also recognition results 4 and 5 in FIG. 1).

The steps of FIG. 3 start with a speech act 11 where a user utters a sequence of words Wint 12. In this case the intended semantic meaning of this word sequence is irrelevant. The aspects of articulation, prosody, audio environment, microphone, etc. in channel 13 are similar to those aspects in channel 25. The speech recognizer returns a recognized sequence of words Wrec 14. The task of error correcting post-processor 15 is to improve the average word error accuracy so that on average Wrec 16 better matches Wint. This goal is significantly different from the goal of the current invention. Also the data that the current invention operates on is significantly different from the data available and used in prior art depicted in FIG. 3.

Figure 4:
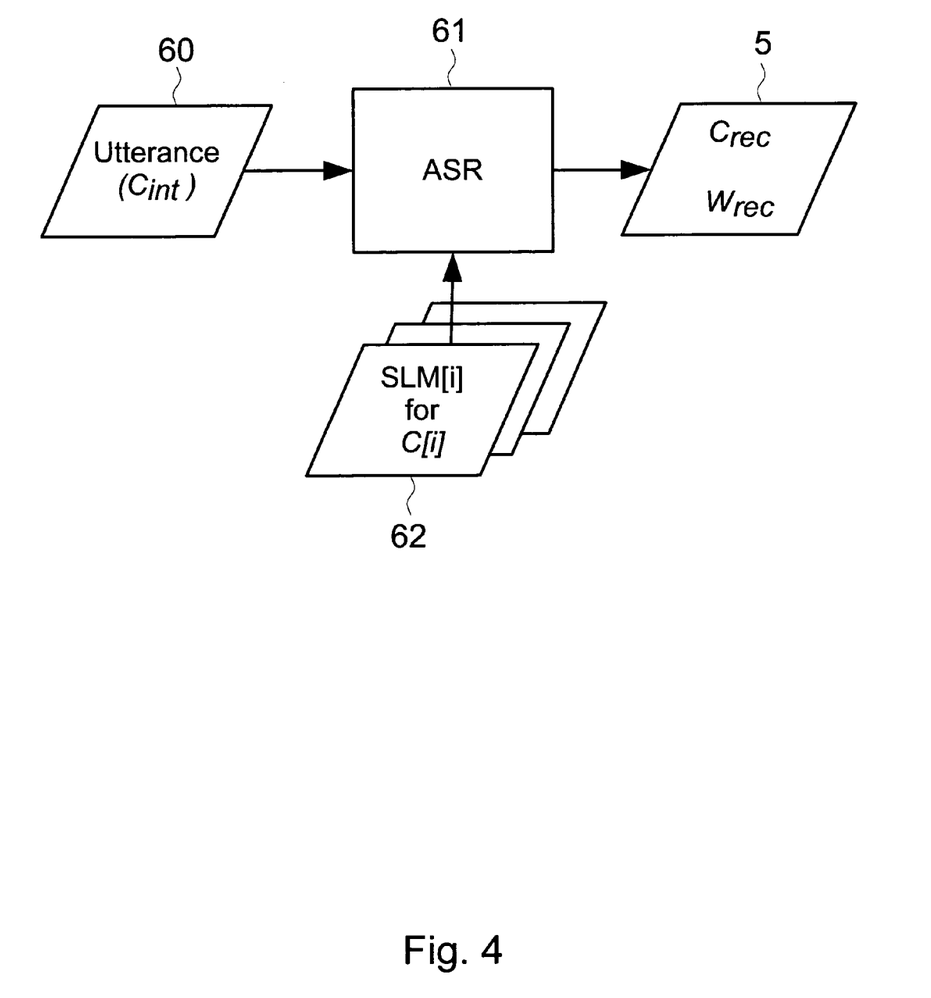
FIG. 4 shows how the use of multiple Statistical Language Models (SLMs) results in recognition of both the word sequence and semantic interpretation.

FIG. 4 shows an example general speech recognition setup to which the current invention applies. Here the ASR 61 uses Statistical Language Models (SLMs) 62 for Speech Recognition. Such SLMs are usually trained on a transcribed corpus and they usually generate many more utterances than the corpus contained. In the following, to differentiate them better from the Conditional Language Models, we call them the First Level SLMs, and we proceed from the fact that they are created per each different semantic interpretation (concept) C[i] in a usual way, for instance, as n-gram SLMs. Using these First Level SLMs 62 ASR 61, when presented with an utterance 60, returns both semantic interpretation Crec and word sequence Wrec as recognition result 5.

Usually, such SLMs over-generate a lot, for instance, they generate any sequence of words out of total lexicon contained in the corpus. Here is an extreme example. If a very frequent word "the" is in the corpus, a sequence "the the the the" would be in the output set of phrases generated by such an SLM although it would have a very low probability.

Such kind of over-generation that creates word sequences irrelevant to a corresponding semantic interpretation (concept) and leads to recognition errors is called in the following a bad over-generation. The present invention aims at reducing the rate of errors related to bad over-generation.

Suppose, we have 3 concepts, and for all of them we created the First Level SLMs in some usual way from the corresponding corpora. Suppose a user uttered an utterance relevant to the second concept. The observations show that if the utterance is recognized as belonging to the right (second) concept, the sequence of recognized words is very close to what the user really said, so the bad over-generation was not used for covering this utterance. However, if the utterance was erroneously misrecognized as belonging to the wrong (say, first) concept, the recognized sequence of words usually shows bad over-generation examples: word combinations non-typical for the first concept utterances appear in this sequence to cover some critical words or phrases relevant to the second concept, but not relevant to the first one.

Now, suppose a user uttered an utterance relevant to the third concept, and it was misrecognized as belonging to the first concept due to the bad over-generation: this case of over-generation and the resulting recognized word sequence will be different, because the bad over-generation will try to cover some critical words or phrases from the third concept by the words from the first one.

Finally, suppose a user uttered an utterance relevant to the first concept, and it was correctly recognized as belonging to the first concept. Instances of bad over-generation would be less likely in this case, and if they happen, they would be statistically typical for the case when the first concept utterance was uttered and the first concept was recognized, because, the first-concept-specific words and phrases would be most likely recognized correctly and in the right order.

The conclusion is: given the recognized concept, the recognized sequence of words is statistically dependent on the intended concept, which is the concept that a user intended to convey when he produced the utterance.

This statistical dependence is the basis of the present invention and is represented by the Conditional Language Models depending on the recognized and intended concepts.

More precisely, a Conditional Language Model CLM (Crec, Cint) is a Statistical Language Model depending on a recognized semantic interpretation (concept) Crec and the intended semantic interpretation (concept) Cint.

Figure 5:
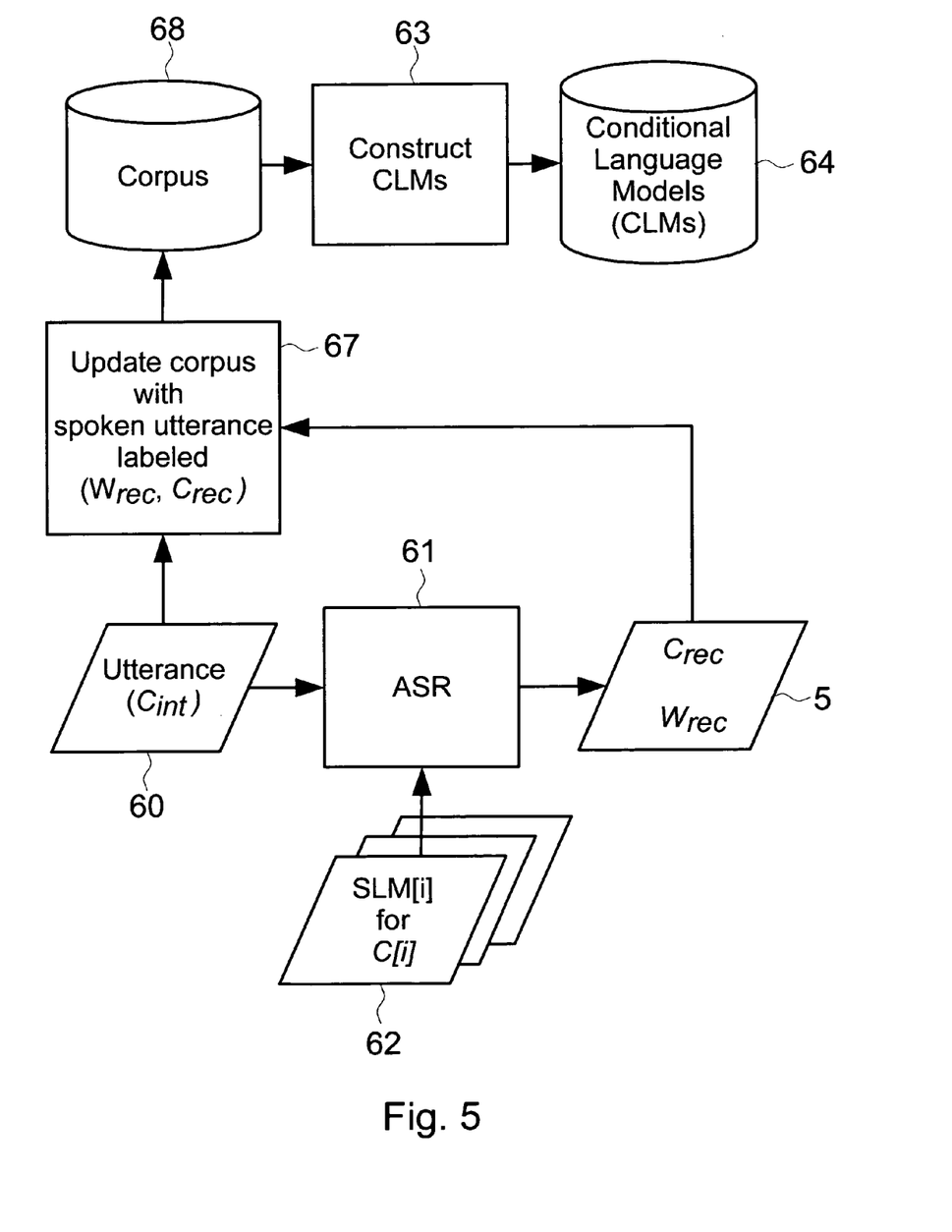
FIG. 5 shows how Conditional Language Models (CLMs) can be obtained for a setup from FIG. 4.
Figure 6:
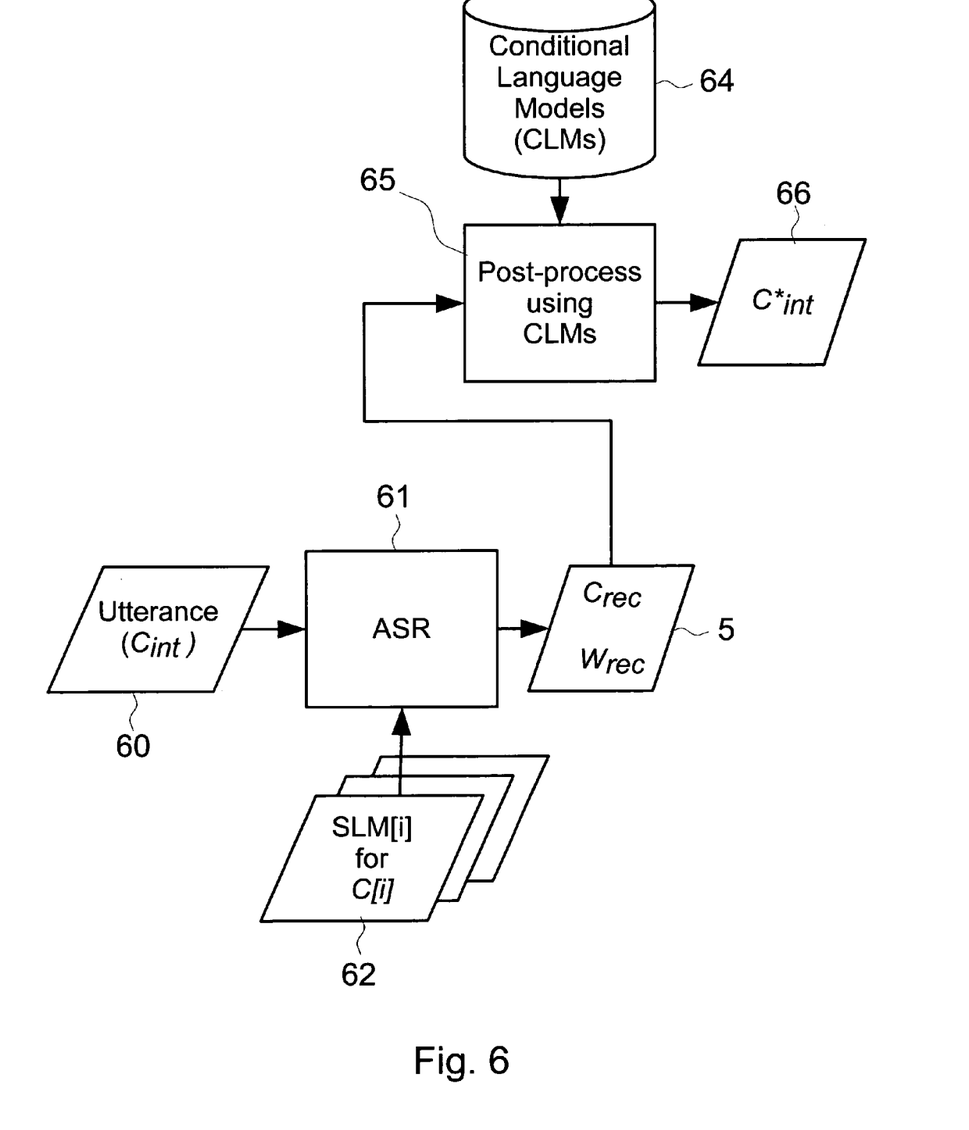
FIG. 6 shows how CLM obtained in FIG. 5 can be used to improve recognition of semantic interpretations.

FIG. 5 shows a general setup in which such Conditional Language Model CLM(Crec, Cint) 64 is trained 63. CLMs are constructed from the corpus 68 containing utterances labeled 67 with (Wrec, Crec) which come from the recognition results 5 (produced by ASR 61 using the First Level SLMs 62). The intended semantic interpretation Cint of the uttered words 60 is detected and added manually offline Once such Conditional Language Models are created, they can be used for getting more accurate semantic interpretation results. FIG. 6 shows a modified setup of FIG. 4 where now CLM 64 is used to post-process 65 the recognition result 5 to generate improved semantic interpretation C*int 66 that on average would have a lower error rate compared to Crec.

Suppose ASR 61 returned a recognized word sequence Wrec and semantic interpretation Crec (5). The method described in this invention will find such a potentially intended semantic interpretation C*int 66 that gives the best match between the recognized word sequence Wrec and the Conditional Language Model CLM(Crec, Cint).

Figure 7:
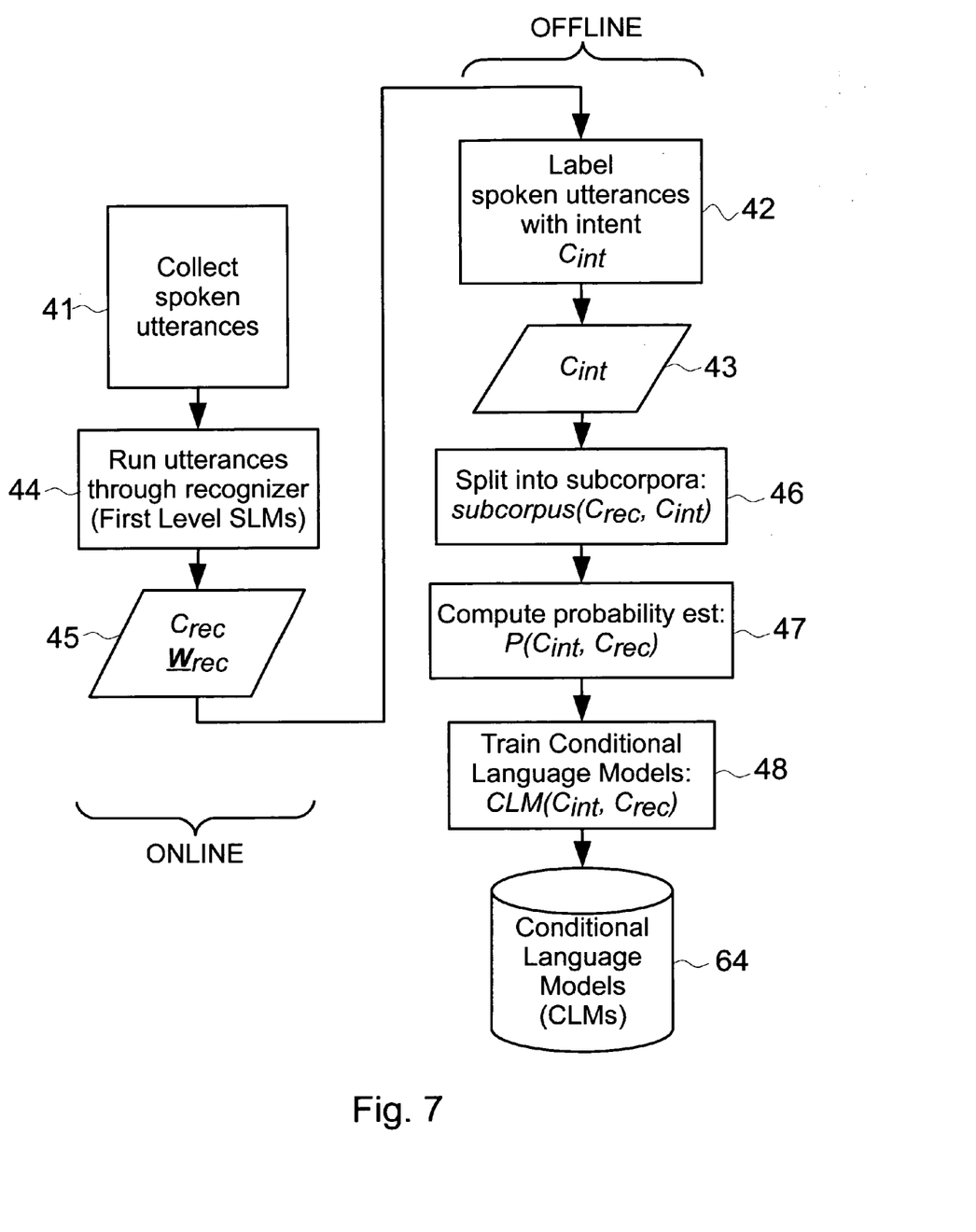
FIG. 7 shows the detailed steps of the process of training a CLM.

FIG. 7 shows the steps that are done during training of the Conditional Language Model 64. It starts with collection 41 of the corpus of utterances from the real traffic in the context of the same speech application. Every utterance is recognized against the First Level SLMs 44 to find for it (Crec, Wrec) 45, where Crec—recognized concept and Wrec—recognized sequence of words. This is done automatically in online mode when the application is processing real incoming calls. The following steps are done offline. The utterances are labeled 42 with Cint—correct intended concept 43 which is done with the help of a human. After that, the entire corpus is split 46 into subsets subcorpus(Crec, Cint) of utterances everyone of which was recognized as concept Crec while the users expressed in them the concept Cint. Next, the a-priori probability of a pair (Crec, Cint) is evaluated 47 by dividing the size of subcorpus(Crec, Cint) by the size of the entire corpus:

$$P(C_{rec}, C_{int}) = \frac{\#subcorpus(C_{rec}, C_{int})}{\#corpus}$$

Finally, using subcorpus(Crec, Cint) Conditional Language Model CLM(Crec, Cint) 64 is trained 48 for some pairs (Crec, Cint), for instance, for pairs whose likelihood of occurrence P(Crec, Cint) is high enough. The recognized word sequences Wrec for all the utterances in subcorpus(Crec, Cint) constitute the corpus that is used to create CLM(Crec, Cint)—a statistical language model for the pair (Crec, Cint). These statistical language models can be, but are not limited by, n-gram Statistical Language Models.

Once statistical Conditional Language Models are created for some pairs (Crec, Cint), the conditional probability P(Wrec/Crec, Cint) for a particular word sequence Wrec can be computed from such models in standard ways.

One of the important benefits of this method is that it is not necessary to manually transcribe the corpus of spoken utterances for CLMs in terms of words. It is sufficient just to label every utterance with the intended concept, while the transcription in terms of recognized words and recognized concept is given by the recognizer.

Figure 8:
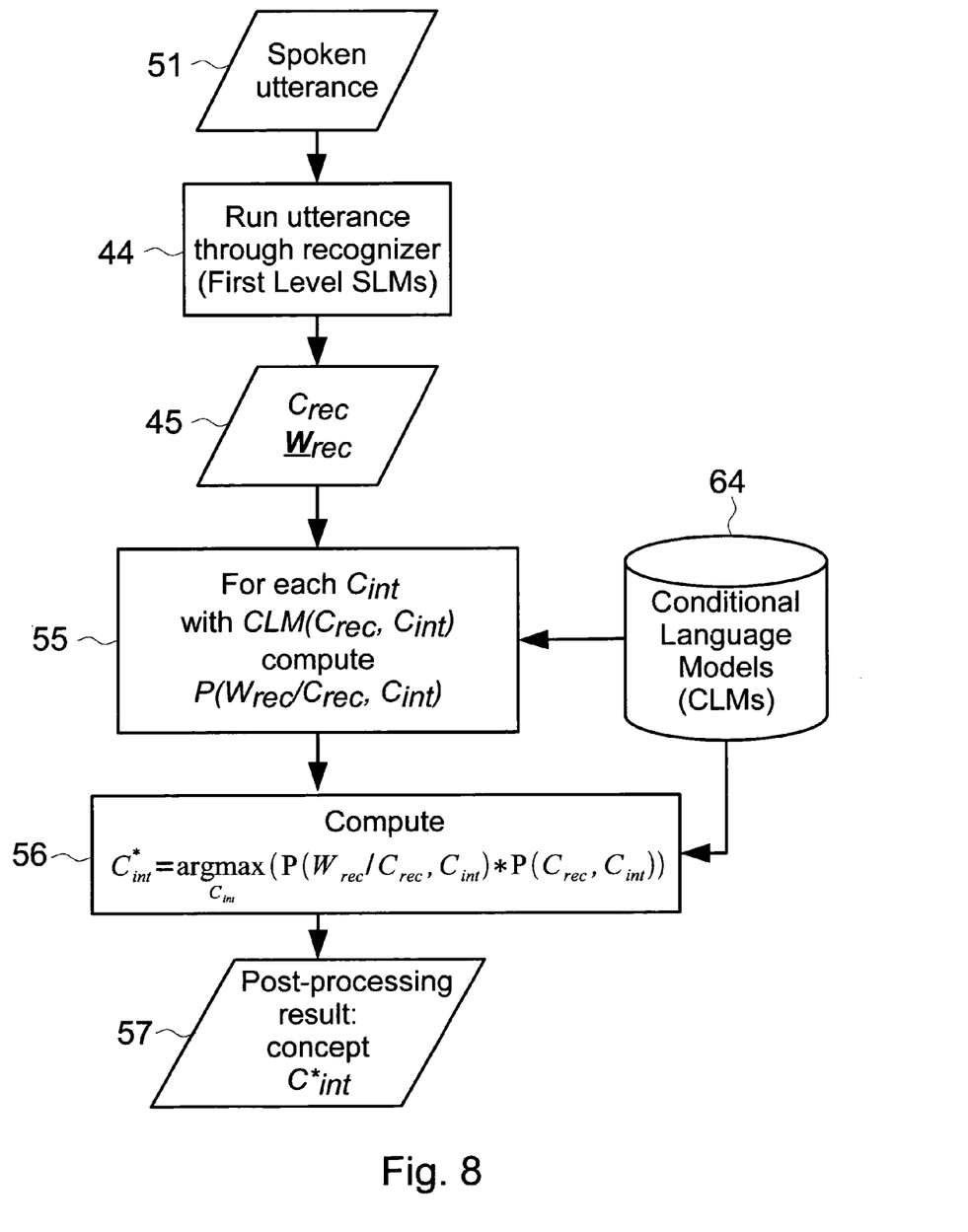
FIG. 8 shows the detailed steps of using the Conditional Language Models for post-processing.

FIG. 8 shows steps executed during use of the CLM for post-processing recognition results like, e.g. in FIG. 6. It starts with recognition 44 of an input utterance 51 against the First Level SLMs finding recognized sequence of words Wrec and recognized semantic interpretation Crec 45.

For every possible intended concept Cint, for which exists CLM(Crec, Cint) 64, the method computes 55 from this CLM the conditional probability of Wrec given (Crec, Cint), which is P(Wrec/Crec, Cint).

Next, the method finds C*int 57 that maximizes P(Wrec/Crec, Cint)*P(Crec, Cint) 56, which is proportional to the a-posteriori probability of an intended concept Cint given the recognized sequence of words Wrec and the recognized concept Crec.

More formally speaking, in order to minimize the semantic interpretation Cint recognition error rate, we maximize the a-posteriori probability of an intended concept Cint given the recognized concept Crec and recognized word sequence Wrec:

$$C^*_{int} = \arg\max_{C_{int}} P(C_{int} / C_{rec}, W_{rec}) =$$

$$\arg\max_{C_{int}} \frac{P(C_{int}, C_{rec}, W_{rec})}{P(C_{rec}, W_{rec})} = \arg\max_{C_{int}} \frac{P(W_{rec} / C_{rec}, C_{int}) * P(C_{rec}, C_{int})}{P(C_{rec}, W_{rec})}$$

Where:

$P(C_{rec}, C_{int})$ is the a-priori probability of the combination of the recognized concept Crec and of the intended concept Cint, and $P(W_{rec}/C_{rec}, C_{int})$ is the conditional probability of word sequence Wrec given the recognized concept Crec and the intended concept Cint, and is computed from the Conditional Language Model CLM(Crec, Cint).

The probability $P(C_{rec}, W_{rec})$ does not affect the choice of the intended concept Cint and can be omitted.

C*int is then declared as the post-processing result 57.

Although the main focus of the present invention is to improve the recognition of semantic tags, it can also be used to improve the word error rate by simply re-recognizing the same utterance against the First Level SLM corresponding to the semantic tag C*int resulting from the post-processing.

In addition to finding a better hypothesis C*int for the intended concept (semantic tag) Cint, the presented invention can be used to improve the decision whether (a) to accept the final post-processing result without confirmation, (b) to confirm it or (c) to reject it. This can be done by using a new confidence computed from the a-posteriori probability of the best intended concept hypothesis (or components that allow to compute it as explained above) together with the original recognition confidence for Crec.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. In a computer-based system for post-processing of recognition results from an Automatic Speech Recognition (ASR) System, said ASR System comprising (a) an input component configured to accept a spoken utterance, $W_{int}$, (b) a processing component comprising one or more Statistical Language Models (SLMs), said processing component configured to process any said spoken utterance, $W_{int}$, and (c) an output component configured to output a result of the processing done by the processing component as a recognition result, said recognition result comprising a recognized sequence of words, $W_{rec}$, and a recognized semantic interpretation, $C_{rec}$, said computer-based system for post-processing comprising one or more Conditional Language Models (CLMs), which are statistical models for computing conditional probabilities, said CLMs trained using a training method comprising the steps of (i) using said ASR System to recognize a plurality of said spoken utterances, $W_{int}$, and to obtain for each of said spoken utterances an output value of said recognition result, $W_{rec}$ and $C_{rec}$, (ii) determining intended semantic interpretation, $C_{int}$, for each of the spoken utterances, $W_{int}$, that were input to said ASR system, (iii) using said intended semantic interpretations, $C_{int}$, to partition all recognized sequences of words, $W_{rec}$, and recognized semantic interpretations, $C_{rec}$, that were output by said ASR system at step (i) into a plurality of training data subsets, so that each said training data subset resulting from said partitioning is associated with (1) exactly one value of said intended semantic interpretation, $C_{int}$, and (2) one or more values of said recognized semantic interpretations, $C_{rec}$, finally (iv) using each said training data subset to train one or more of said CLMs, so that each trained CLM becomes associated with exactly one value of said intended semantic interpretation, $C_{int}$, and one or more values of said recognized sematic interpretations, $C_{rec}$, that are associated with the training data subsets used to train said CLM;

a computer-implemented method for post-processing of said recognition result, said recognition result outputted from said ASR System as result of using the ASR System to process an input comprising said spoken utterance, $W_{int}$, the outputted recognition result comprising said recognized sequence of words, $W_{rec}$, and said recognized semantic interpretation, $C_{rec}$, said computer-implemented post-processing method comprising the steps of:

selecting those trained CLMs which are associated with the recognized semantic interpretation, $C_{rec}$, that is comprised in the said recognition result outputted when using said ASR System, for each of the selected CLMs, CLM(k), computing a $k^{th}$ decision factor value, DF(k), from $k^{th}$ data, the $k^{th}$ data comprising:
(I) the $k^{th}$ intended semantic interpretation, $C_{int}(k)$, as associated with the selected CLM(k),
(II) a $k^{th}$ conditional probability, $P(W_{rec}|C_{rec},C_{int}(k))$, for the recognized sequence of words, $W_{rec}$, given both the recognized semantic interpretation, $C_{rec}$, and the $k^{th}$ intended semantic interpretation, $C_{int}(k)$, said $k^{th}$ conditional probability computed from said CLM(k) given the recognized semantic interpretation $C_{rec}$ and the recognized sequence of words $W_{rec}$, both $C_{rec}$ and $W_{rec}$ comprised in the said recognition result outputted when using said ASR System,
(III) a $k^{th}$ a-priori probability, $P(C_{int}(k),C_{rec})$, of a pair of the $k^{th}$ intended semantic interpretation, $C_{int}(k)$, and the recognized semantic interpretation, $C_{rec}$, said $k^{th}$ a-priori probability determined from prior ASR use data, the prior ASR use data obtained while previously using the ASR system to recognize a plurality of prior spoken utterances, said prior ASR use data comprising (A) intended semantic interpretations for said plurality of prior spoken utterances input into the ASR System and (B) corresponding recognized semantic interpretations comprised in the recognition results output from the ASR System as result of processing said prior spoken utterances, selecting such $k^{th}$ intended semantic interpretation, $C_{int}(k)$, associated with the $k^{th}$ selected CLM, CLM(k), for which the computed decision factor value, DF(k), is maximal among said computed decision factor values and declaring said selected $k^{th}$ intended semantic interpretation, $C_{int}(k)$, an optimal semantic interpretation, outputting the optimal semantic interpretation via computer-writable media.

2. The computer-implemented post-processing method of claim 1, wherein the processing component of said ASR System has a plurality of SLMs, each SLM configured as a dedicated SLM to process said spoken utterances with respect to a selection of one or more of said semantic interpretations, $C_{int}$, out of all the semantic interpretations that said ASR system is configured to recognize, the dedicated SLMs not all configured in the same way, said post-processing method further comprising the steps of:

(a) in the processing component of the ASR system identifying those said dedicated SLMs which are configured with respect to a selection of said semantic interpretations, $C_{int}$, such that said selection comprises the optimal semantic interpretation outputted by the method of claim 1,
(b) re-inputting the spoken utterance, that was uttered when using the ASR System, to be re-recognized by said ASR System, wherein in the processing component of the ASR System only those dedicated SLMs are used which were identified in the previous step (a),
(c) taking the recognition result outputted by the ASR System in step (b) and outputting the re-recognized word sequence, $W_{rec}$, comprised in that recognition result, via computer-writable media.

3. The computer-implemented post-processing method of claim 1, wherein the output component of the ASR System further outputs a first confidence value of the recognition result, said post-processing method further comprising the steps of:

computing a second confidence value for the optimal semantic interpretation outputted by the method of claim 1, the input to the computation of the second confidence value comprising:
the $k^{th}$ conditional probability, $P(W_{rec}|C_{rec},C_{int}(k)))$ from the $k^{th}$ iterative step of the method of claim 1, the $k^{th}$ step corresponding to the optimal semantic interpretation,
the $k^{th}$ a-priori probability, $P(C_{int}(k),C_{rec})$, from the $k^{th}$ iterative step of the method of claim 1, the $k^{th}$ step corresponding to the optimal semantic interpretation,
the first confidence value of the recognition result,
outputting the second confidence value via computer-writable media.

4. A computer-based system for post-processing of an output of an Automatic Speech Recognition (ASR) System, said ASR System comprising (a) an input component configured to accept a spoken utterance, $W_{int}$, (b) a processing component comprising one or more Statistical Language Models (SLMs), said processing component configured to process any said spoken utterance, $W_{int}$, and (c) an output component configured to output a result of the processing done by the processing component as a recognition result, said recognition result comprising a recognized sequence of words, $W_{rec}$, and a recognized semantic interpretation, $C_{rec}$, said computer-based system for post-processing comprising:

a processor,
a memory,
a computer readable representation of Conditional Language Models (CLMs), which are statistical models for computing conditional probabilities,
a first component configured for (i) collecting usage data from using said ASR System to recognize said spoken utterances, said usage data comprising a plurality of said spoken utterances, $W_{int}$, together with corresponding output values of said recognition result, $W_{rec}$ and $C_{rec}$, obtained for each of said spoken utterances, (ii) determining intended semantic interpretation, $C_{int}$, for each of the collected spoken utterances, $W_{int}$, (iii) using said intended semantic interpretations, $C_{int}$, to partition all recognized sequences of words, $W_{rec}$, and recognized semantic interpretations, $C_{rec}$, that were output by said ASR system at step (i) into a plurality of training data subsets, so that each said training data subset resulting from said partitioning is associated with (1) exactly one value of said intended semantic interpretation, $C_{int}$, and (2) one or more values of said recognized semantic interpretations, $C_{rec}$, finally (iv) using each said training data subset to train one or more of said CLMs, so that each trained CLM becomes associated with exactly one value of said intended semantic interpretation, $C_{int}$, and one or more values of said recognized sematic interpretations, $C_{rec}$, that are associated with the training data subsets used to train said CLM, a second component configured to provide a-priori probabilities, $P(C_{int}, C_{rec})$, of a pair of the intended semantic interpretation and the recognized semantic interpretation, said a-priori probability determined from prior ASR use data, the prior ASR use data obtained while previously using the ASR system to recognize a plurality of prior spoken utterances, said prior ASR use data comprising (A) intended semantic interpretations for said plurality of prior spoken utterances input into the ASR System and (B) corresponding recognized semantic interpretations comprised in the recognition results output from the ASR System as result of processing said prior spoken utterances, a third component configured for:
  taking as input the recognition result from said ASR System, said recognition result outputted from said ASR System as result of processing an input comprising said spoken utterance, $W_{int}$, the outputted recognition result comprising said recognized sequence of words, $W_{rec}$, and said recognized semantic interpretation, $C_{rec}$
  selecting those CLMs trained by the first component which are associated with the recognized semantic interpretation, $C_{rec}$, that is comprised in the said recognition result outputted when using said ASR System,
  for each of the selected CLMs, CLM(k), computing a $k^{th}$ decision factor value, DF(k) from $k^{th}$ data, the $k^{th}$ data comprising:
    (I) the $k^{th}$ intended semantic interpretation, $C_{int}(k)$, as associated with the selected CLM(k),
    (II) a $k^{th}$ conditional probability, $P(W_{rec}|C_{rec}, C_{int}(k))$, for the recognized sequence of words, $W_{rec}$, given both the recognized semantic interpretation, $C_{rec}$, and the $k^{th}$ intended semantic interpretation, $C_{int}(k)$, said $k^{th}$ conditional probability computed from said CLM(k) given the recognized semantic interpretation $C_{rec}$ and the recognized sequence of words $W_{rec}$, both $C_{rec}$ and $W_{rec}$ comprised in the said recognition result outputted when using said ASR System,
    (III) a $k^{th}$ a-priori probability, $P(C_{int}(k), C_{rec})$, of a pair of the $k^{th}$ intended semantic interpretation, $C_{int}(k)$, and the recognized semantic interpretation, $C_{rec}$, said $k^{th}$ a-priori probability obtained from the second component,
  selecting such $k^{th}$ intended semantic interpretation, $C_{int}(k)$, associated with the $k^{th}$ selected CLM, CLM(k), for which the computed decision factor value, DF(k), is maximal among said computed decision factor values and declaring said selected $k^{th}$ intended semantic interpretation, $C_{int}(k)$, an optimal semantic interpretation,
  outputting the optimal semantic interpretation via computer-writable media.

5. The computer-based post-processing system of claim 4, wherein the processing component of said ASR System has a plurality of SLMs, each SLM configured as a dedicated SLM to process said spoken utterances with respect to a selection of one or more of said semantic interpretations, $C_{int}$, out of all the semantic interpretations that said ASR system is configured to recognize, the dedicated SLMs not all configured in the same way, said computer-based post-processing system further comprising:
  a fourth component communicating with the processing component of the ASR system and identifying those said dedicated SLMs which are configured with respect to a selection of said semantic interpretations, $C_{int}$, such that said selection comprises the optimal semantic interpretation outputted by the method of claim 4
  a fifth component configured for:
    submitting the spoken utterance, that was uttered when using the ASR System, to be re-recognized by said ASR System wherein in the processing component of the ASR System only those dedicated SLMs are used which were selected by the fourth component,
    and taking the new recognition result outputted by the ASR System and outputting the re-recognized word sequence, $W_{rec}$, comprised in that recognition result via computer-writable media.

6. The computer-based post-processing system of claim 4 wherein the output component of the ASR System further outputs a first confidence value of the recognition result, wherein said computer-based post-processing system further comprises:
  a sixth component configured for:
    computing a second confidence value for said optimal semantic interpretation outputted by the system of claim 4, the input to the computation of the second confidence value comprising:
      the $k^{th}$ conditional probability, $P(W_{rec}|C_{rec}, C_{int}(k)))$ from the $k^{th}$ iterative step of the third component of claim 4, the $k^{th}$ step corresponding to the optimal semantic interpretation output by the third component,
      the $k^{th}$ a-priori probability, $P(C_{int}(k), C_{rec})$, from the $k^{th}$ iterative step of the third component of claim 4, the $k^{th}$ step corresponding to the optimal semantic interpretation output by the third component,
      the first confidence value for the recognition result,
    and outputting the second confidence value via computer-writable media.

\* \* \* \* \*